Patented June 13, 1939

2,162,204

UNITED STATES PATENT OFFICE 2,162,204

DENTURE

George S. Weith, Caldwell, N. J., assignor to Bakelite Corporation, New York, N. Y., a corporation of Delaware No Drawing. Application March 11, 1937, Serial No. 130,315

2 Claims. (Cl. 32—2)

This invention relates to procedures and materials which are especially useful in the production of dentures, particularly synthetic resin dentures and more distinctively dentures of the phenol-formaldehyde type, although the invention is generally applicable to other articles made of different compositions and treated in the manner hereinafter set forth.

For purposes of explanation, the invention will be described in connection with dentures of the phenol aldehyde resins and the repair of such dentures.

The usual denture comprises a plate adapted to be held against the gums of the wearer and teeth which are held in position on the plate by embedment in the material from which the plate is composed. These dentures are subject to breakage, very frequently a tooth being broken. In order to effect repair according to the usual method in the case of a resin denture, the entire broken tooth is cut away from the denture and a portion of plastic denture material and a new tooth are set in place. Then the entire denture is foiled, both inside and out, invested in a suitable investment compound and cured. The protection of the denture by foiling has been considered necessary as the curing usually occurs in the presence of a medium which affects the denture material, frequently discoloring it; for instance moisture from either the investment compound or the curing apparatus may discolor the denture material. Various denture coating materials have been suggested for use instead of foil but these have numerous defects, among which are their lack of resistance to the moisture or steam which is present in the most commonly used methods of curing dentures, or the coating is difficult to remove from the finished denture, or the coating is removable only by the aid of acids or alkalies or organic solvents, materials which not only remove the coating but which may also affect the denture.

One of the objects of the present invention, therefore, is to provide a coating composition which can easily and quickly be applied to the denture to protect it from the moisture or other medium which may deleteriously affect it during the curing operation.

Another object of this invention is to provide a protective covering which may easily be removed from the finished denture.

A further object is to provide a simple and easily adaptable technic for use in connection with dentures in which the use of foil is to a great extent eliminated.

Additional objects and features of the invention will be obvious or pointed out in the following description and the accompanying claims.

I have found that the art relating to the production of dentures and similar objects can be improved greatly by covering the denture (or base material if another object is treated) with a composite coating the parts of which have different characteristics. In the case of a denture of synthetic resin which is affected by moisture or steam, I prefer to apply first a covering of a primary protecting material and over this covering is applied a secondary protecting material, the characteristics of the two materials being correlated with respect to each other and to the denture material.

The coating materials are preferably correlated as to their respective absorptive powers and permeability in respect to the moisture or other medium from which the denture material is to be protected, that is the coverings have differential absorption and permeability. In the case of protecting a synthetic resin denture from moisture, the primary protecting material which lies nearer the denture material has a relatively large moisture absorptive characteristic and the secondary protecting material preferably is substantially impervious to moisture being less pervious than the primary material is absorptive. Thus any moisture which may penetrate through the outer or secondary covering is absorbed by the inner or primary covering and the absorption characteristic of this inner covering is preferably correlated to the denture material so that it gives to the denture material substantially none of the moisture which it may absorb. Thus the denture is quite thoroughly protected. In practice it has been found that the primary covering preferably has an absorption characteristic greater than 1 to 5% and the outer covering has a permeability characteristic of less than 1 to 5%.

The inner and outer coverings, particularly the inner, also preferably have other characteristics which render them particularly useful for their intended purposes. According to the preferred form of the invention the inner coating and preferably both coatings are fluids at the time they are applied to the denture. As such they may readily be applied in any suitable manner, for instance by brushing, spraying, dipping and the like, and they follow the form of the denture very exactly. The inner coating should also adhere quite strongly to the denture directly after application and should not crack, and should have sufficient flexibility and toughness so that it is not ruptured during manipulation of the denture or during curing and it should at all times protect the denture material against the outside influences to which the denture material is susceptible, yet this coating should not deleteriously affect the denture material and must readily release from the cured denture. I have succeeded in accomplishing these desirable results by using an inner covering which does not itself affect the denture material but which is susceptible to change after application to the denture, and preferably during curing of the denture, whereby the inner coating readily releases from the cured denture. For this purpose, I prefer to use a release agent which may attack the primary protecting material during the later stages of the curing process and I have found that this agent may be the moisture, although it may be a material which may penetrate the outer covering or be generated by either covering or the denture itself. In using the moisture which is generated by the investment material or which is within the curing apparatus, the outer coating is not wholly impervious to moisture but passes, say 0.1% to 5% of moisture, to the inner coating, which is sufficient to attack the inner coating and make it release from the finished denture but is insufficient to have any substantial effect on the denture material because of the absorptive characteristics of the inner coating. The inner and outer coatings are thus correlated from this point of view. It should be understood, however, that although moisture is used for convenience in the preferred process, any other release agent may be used and it is not necessary that it be the medium from which the denture is protected.

Another feature of my invention is that the coatings preferably delay passage of the release agent and the medium from which the denture is to be protected. Thus, in the present example, although the outer coating may pass from 0.1% to 5% of moisture to the inner coating it is preferable that this be the total amount of moisture passed during the entire process. Thus, if a resin denture requires an hour to cure, the characteristics of the inner and outer coatings are preferably correlated so that the inner coating only gets sufficient of the release agent in say 45 or 50 minutes to effect release of the inner coating from the denture when the assembly is removed from the curing apparatus. In case the release agent is generated by the denture material or either coating, for instance by salts which give off water, or other fillers, this same desideratum is effected.

The delayed and limited passage of the moisture may be obtained by any suitable means and very conveniently by the use of appropriate fillers in the coating materials. Here again the type and quantity of filler is correlated to the coatings in which they are contained. In case the coating is of a type which is somewhat permeable or becomes so during the curing, the fillers may be such that they obstruct the passage of moisture whereas if the coating is of the non-permeable type, the fillers may be such that they pass the moisture. One of the preferred fillers is flake metal, for instance aluminum flake. When a coating containing this filler is brushed on the denture, the flakes orient themselves and form a barrier against the moisture. This is particularly desirable for the top coating. One of the preferred fillers for the under coating is powdered talc which is somewhat flaky and yet as compared to metal will take up more water thereby protecting the denture material while holding the water as a release agent.

As primer coats, suitable compositions have been found to be solutions of cellulose esters or ethers such as cellulose nitrate or acetate, or benzyl or ethyl cellulose, vinyl esters such as vinyl acetate or chloride, esters of polyhydric alcohols and polybasic acids, i. e., the so-called alkyd resins. From 2% to 10% of these materials are usually dispersed in a suitable solvent as, for example, acetone, alcohol, ethylacetate, etc., along with from 20–50% of a suitable filler such as talc, lithopone, barium sulphate or the like which will take up a slight amount of water, as indicated above. This composition is applied in any suitable manner, brushing, spraying, or the like, allowed to dry thoroughly and then coated with the more water resistant coating.

Suitable compositions found for the top coating are dispersions of rubber, halogenated rubber, rubber degraded by tin chloride derivatives so-called "Pliolite", polymerized styrene, etc. From 4% to 10% of these materials are dispersed in a solvent such as benzol, toluol or other suitable hydrocarbon solvent, which solvent is preferably not a solvent or at least a poor solvent for the composition used in the primer coat. Suitable fillers which are preferably quite water repellent such as aluminum flake, waxes, bitumens, etc., may be incorporated in the dispersion. This composition is applied either by brushing or spraying and then allowed to dry thoroughly. Either the primer composition or the top coat is usually air dried, although such drying may be accelerated by force drying, that is, drying at temperatures up to about 80° C. The above characteristics of fillers are desirable in the preferred form of the invention but where the preferred form is not used, it is possible to incorporate either type of filler in either coat.

The application of these coatings in repairing dentures may advantageously be illustrated by describing the technic employed in making a tooth repair.

The broken tooth is removed with a burr, cutting away as little of the denture material as possible although the quantity removed should be sufficient to allow the insertion of enough new material firmly to embed the new tooth and unite with the denture. The repair area is then packed with the repair material, for example a phenol-formaldehyde resin, this material being slightly warmed until plastic, for instance to a putty-like consistency. A convenient method of packing is to warm a little of the new material on a spatula and press the material into the repair space. The new tooth is warmed and pressed into position. The tooth and repair area are now covered with a small piece of tinfoil and the whole denture completely coated with the primer coat, preferably of about 0.003 of an inch in thickness. This is allowed to dry thoroughly and then given a top coat of the more water resistant composition, preferably of about 0.001 of an inch in thickness. This is allowed to dry thoroughly, and then the denture invested and cured under the conditions required for transforming the synthetic resin employed for the repair to the finished state. When the cure is completed and the investment compound removed, it will be found that the coatings are easily removable from the denture, leaving a denture requiring little or no cleaning or polishing. Furthermore, the denture will show no evidence of having been affected by the steam used in the curing.

The following description of coating compositions suitable for a primer coat and those suitable for top coat are illustrative only of the various types of composition which may be used.

*Example 1.*—2.2 parts cellulose acetate, 65.9 parts acetone, and 31.9 parts talc are ball milled together for 15 hours. This gives a composition suitable for a primer coat which can be dried in 8-10 minutes at 60° C. The viscosity of such a coating composition is about 22-25 centipoises and a film .002-.003 of an inch in thickness absorbed about 3-5% moisture when immersed in water at 30° C. for 24 hours.

*Example 2.*—4 parts vinyl acetate, 122 parts acetone, 64 parts talc and 10 parts lithopone are ball milled together for 15 hours. This gives a composition suitable for a primer coat which can be dried in 8-10 minutes at 60° C. The viscosity and moisture absorption capacity was of an order equivalent to that of Example 1.

*Example 3.*—3 parts of the fusible condensation product of glycerol and phthalic anhydride, 60 parts acetone, 65 parts ethyl acetate, 64 parts talc and 10 parts barium sulphate are ball milled together for 15 hours. This gives a composition suitable for a primer coat which can be dried in 6-10 minutes at 60° C. The viscosity of the solution was about 20-25 centipoises and the moisture absorption capacity about 2-6% when measured as in Example 1.

*Example 4.*—4.74 parts Pliolite, .2 part carnauba wax, 21.4 parts aluminum flake, and 73.66 parts benzol are mixed together and heated to the boiling point of the solvent, then cooled. This composition can be used for a top coat, and will dry in 8-10 minutes at 60° C. The viscosity of the solution was about 20-23 centipoises and the moisture absorption capacity of less than 1% when measured as in Example 1.

*Example 5.*—9 parts of rubber, 15 parts beeswax, 41.5 parts aluminum flake and 149 parts benzol are heated together to the boiling point of the solvent. This composition proved suitable for a top coat, and will dry in 8-10 minutes at 60° C. The viscosity of the composition was about 20-25 centipoises and the moisture absorption of the deposited film was about 2-3%.

*Example 6.*—9 parts styrene, 42 parts aluminum flake and 149 parts of benzol are heated together to the boiling point of the solvent. This composition proves suitable for a top coat and dries in 5-8 minutes at 60° C. The viscosity of the composition was approximately 25 centipoises and the moisture absorption of the deposited film was about 2%.

Sample bars of a standard phenol-formaldehyde denture resin were coated with the primer coat described in Example 1 and the top coat described in Example 4. The water absorption of the composite film, about .003 of an inch in thickness, was less than 1% when immersed in water at 30° C. for 24 hours. A similar result was obtained using the primer coat described in Example 2 and top coat of either Example 4 or 6. Using the primer coat described in Example 3 and top coat described in Example 5, the water absorption of the composite film was less than 1.5%. The word "absorption" and similar expressions used herein are intended to define the ability of certain materials to take up another material, for instance water, whether this be by way of a purely physical action or a chemical action or both.

While these coating compositions have been described as useful in the repair of synthetic resin dentures it is also feasible to use them as protective coatings on wood, metal, stone, porcelain, particularly where it is desired to employ a composition as a temporary protective coating for instance instead of a masking tape, which may subsequently be removed without difficulty. It is therefore to be understood that the invention has a wider application than merely to dentures and is to be construed as broadly as the claims taken in conjunction with the prior art, may allow.

I claim:

1. Method of protecting a denture from a medium which affects the material of said denture during treatment thereof which comprises covering the denture with a primary protecting material which is relatively absorbent of said medium, covering the primary protecting material with a secondary protecting material which is substantially impervious to the medium, and subjecting the assembled denture and coverings to the desired treatment.

2. Method of protecting a synthetic resin denture from the effects of moisture during treatment thereof in the presence of moisture which comprises coating the denture with a primary protecting material which is relatively absorbent of moisture, coating the primary protecting material with a secondary protecting material which is substantially impervious to moisture and subjecting the coated denture to heat in the presence of moisture to prepare the denture.

GEORGE S. WEITH.